United States

Fields

[11] 3,761,171
[51] Sept. 25, 1973

[54] NEGATIVE-POSITIVE, POSITIVE-POSITIVE EXPOSURE STATION

[75] Inventor: Gary D. Fields, Parker, Colo.

[73] Assignee: Eastman Kodak Company, Rochester, N.Y.

[22] Filed: Feb. 17, 1972

[21] Appl. No.: 227,239

[52] U.S. Cl. .......................... 355/3, 355/11, 96/1 R, 350/160 R, 350/160 P
[51] Int. Cl. ...................... G03g 15/04, G03g 15/00
[58] Field of Search ..................... 355/3, 14, 17, 11, 355/18; 96/1; 350/160, 160 P

[56] References Cited
UNITED STATES PATENTS

| | | | |
|---|---|---|---|
| 2,892,380 | 6/1959 | Baumann et al. | 350/160 R |
| 3,589,896 | 6/1971 | Wilcox | 96/1 R |
| 3,671,231 | 6/1972 | Haas et al. | 96/1 R |

*Primary Examiner*—Robert P. Greiner
*Attorney*—W. H. J. Kline et al.

[57] ABSTRACT

An exposure station is provided for making both negative-positive and positive-positive electrophotographic prints without employing reverse development techniques to develop one of the images. This is accomplished by projecting an image of a negative original onto a photoconductive-liquid crystal sandwich structure across which a potential is applied to form a temporary image in the liquid crystal, which temporary image is the reverse of the negative original. This temporary image is then projected onto a charged photoconductive surface to form a positive electrostatic latent image. In the positive-positive mode the same light source can be used in a first embodiment to project an image of a positive original through the photoconductive-liquid crystal sandwich, when in its transparent state, onto the photoconductive surface. In a second embodiment a separate light source can be used for projecting an image of the positive original to form a positive electrostatic latent image on the charged photoconductive surface. In addition, control means is provided to assure that the image of only one original can be projected at a time. In a third embodiment a single light source is used for both the negative-positive mode and the negative-negative mode.

17 Claims, 3 Drawing Figures

NEGATIVE-POSITIVE, POSITIVE-POSITIVE EXPOSURE STATION

BACKGROUND OF THE INVENTION

1. Field of the Invention

This invention relates to an exposure station, and more particularly to an exposure station for an electrophotographic apparatus in which positive prints can be made from either a negative original or a positive original without the use of reverse development techniques for developing one of the images.

2. Description of the Prior Art

Toward the end of the 19th Century, F. Reinitzer and O. Lehmann independently observed that certain substances in passing from a solid crystalline state to an isotropic liquid state pass through a state or condition over a given temperature range wherein they display rheological properties similar to that of fluids, but have optical properties similar to that of the crystalline state. In order to identify these properties, Lehmann used the term "liquid crystal", which terminology persists today. Present thinking tends to regard substances which exhibit these properties as being in a fourth state of matter known as the mesomorphic state or mesophase since it is a state or phase intermediate that of the anisotropic crystal and that of the isotropic liquid.

There are three distinct mesomorphic states or forms, namely, the smectic mesophase, the nematic mesophase and the cholesteric mesophase. A nematic liquid crystal is essentially transparent, and therefore transmits light, but when placed in a d.c. electric field the molecules of some of these liquid crystals become disoriented so that the material diffuses light and becomes milky white in appearance. When the d.c. electric field is removed, the molecules of the liquid crystal return to their previous orientation so that the liquid crystal is again transparent. This phenomena is discussed in PROCEEDINGS OF THE I.E.E.E., for July, 1968, in an article entitled: "Dynamic Scattering: a New Electro-optical Effect in Certain Classes of Nematic Liquid Crystals", by Heilmeier, Zanoni and Barton at pages 1,162–1,171.

The reflective optical storage effect of mixtures of cholesteric and nematic liquid crystal materials is discussed in a paper appearing in APPLIED PHYSICS LETTERS for Aug. 15, 1968 in an article entitled, "A New Electric Field Controlled Reflective Optical Storage Effect in Mixed-Liquid Crystal Systems", by Heilmeier and Goldmacher at pages 132 and 133, in which the authors describe how a mixture of nematic and cholesteric mesomorphic materials serve as an optical storage under a d.c. or low frequency a.c. electric field, which changes the initially transparent material to a milky white light-diffusing material. The liquid crystal material remains in the light-diffusing state upon removal of the d.c. field. The mixture can be rapidly erased or changed back to a transparent state by the application of a high frequency a.c. signal greater than 700 Hz.

U.S. Pat. No. 2,892,380 to Baumann et al describes a schlieren-optical system for amplifying the light intensity of an optically projected image. A multiple layer control cell, consisting of a liquid crystal layer and a photoconductive layer, is bounded by a pair of electrodes which are connected to a d.c. source. The liquid crystal layer is a type which has an electric Kerr effect. An electrically non-conductive mirror is arranged between the photoconductive and liquid crystal layers to provide optical isolation between a light image and a secondary light source. The light image is rastered on the photoconductive layer so that it becomes conductive in those areas where light strikes it. This produces a nonhomogeneous electric field between the electrodes corresponding to the light image which results in local variations in the index of refraction of the liquid crystal material corresponding to the light image. Light from a secondary source is reflected from the nonconducting mirror surface in accordance with the image pattern on the liquid crystal and is projected onto a screen to form a visible image.

In a conventional electrophotographic system a photoconductive surface is uniformly charged, as by a corona charger, which surface is then exposed to a pattern of radiation that dissipates the charge on the photoconductive surface in the exposed areas to form an electrostatic latent image corresponding to the original image. This image may then be developed by bringing it in contact with toner particles having a charge of opposite polarity to that of the electrostatic latent image to form a toner image which can be transferred to a suitable receiver or fused to the photoconductive surface, if it is to serve as a receiver. However, in order to make a positive electrophotographic copy from a negative original, such as negative microfilm, it is necessary to reverse develop the exposed photoconductive surface i.e., develop the discharged areas of the photoconductive surface rather than the charged areas. One way to accomplish this is to charge the photoconductive surface to a polarity opposite that used in the positive-positive mode and provide a development electrode behind the photoconductive surface to which a bias potential, having a polarity opposite the polarity of the toner particles and the charge pattern, is applied so that the toner particles are repelled from the charged area and attracted to the uncharged area. However, some photoconductive materials will not retain both a positive and negative charge and therefore can only be charged one way. For example, selinium will hold only a positive charge whereas zinc oxide usually will hold only a negative charge. With such materials, reverse development can only be accomplished by using toner of opposite polarity with a development electrode. However, it is a very difficult and time consuming job to change toner. Also, in actual practice it has been found that reverse development techniques usually result in a print of inferior quality as compared to a print made by direct development techniques.

SUMMARY OF THE INVENTION

In accordance with this invention an exposure station is provided for forming a latent image on a photosensitive surface from either a first original or a second original, which is the reverse of the first original, wherein the latent image is always the reverse of the first original and the same as the second original. This exposure station includes means for supporting the photosensitive surface for exposure, means for forming a temporary image which is the reverse of the first original, means for supporting the first and second originals, means for projecting an image of the first original onto the temporary image forming means to form the reverse image, means for projecting the reverse temporary image onto the photosensitive surface to form a latent image thereon which is the reverse of the first original, means for supporting the second original, means for projecting the second original onto the photosensitive surface to form a latent image which is the same as the second original, and means for selectively projecting an image of either the first or the second original.

More particularly, an exposure station is provided for forming a positive electrostatic latent image on a charged photoconductive surface from either a positive original or a negative original. A negative original is projected, as by means of ultraviolet light, onto a layered sandwich which includes in order: a first transparent electrode, a photoconductive layer which is responsive only to ultraviolet radiation, a liquid crystal layer, and a second transparent electrode. Means are provided for applying a d.c. potential across the electrodes when the photoconductive surface is exposed to an ultraviolet radiation pattern corresponding to the negative original to form a reverse or positive image in the liquid crystal layer. This temporary image is projected by a white light source onto a charged photoconductive surface to form a positive electrostatic image thereon which can be toned or otherwise utilized. In one embodiment a positive original support is provided which may be moved to a position between the white light source and the sandwich structure so that the positive image may be projected through the transparent sandwich structure when no potential is applied thereacross so that the positive image is projected onto the charged photoconductive surface to form a positive electrostatic image of the positive original. In another embodiment, a second white light source is provided for projecting an image of a positive original directly onto the charged photoconductive surface without passing through the sandwich structure. In this embodiment, a pivoted mirror is provided which is movable from a first position for reflecting the image of the temporary image onto the photoconductive surface to a second position out of the projection path of the image of the positive original. In addition, in each embodiment means are provided for selectively projecting an image of either the positive original or the negative original to form a positive electrostatic image.

Thus, it can be seen that a positive electrostatic image can be formed on a charged photoconductive surface from either a positive or negative original so that a positive print can be made without the necessity of employing reverse development techniques.

Additional advantages of this invention will become apparent from the description which follows, taken in conjunction with the accompanying drawings.

DESCRIPTION OF THE PREFERRED EMBODIMENT

Figure 1:
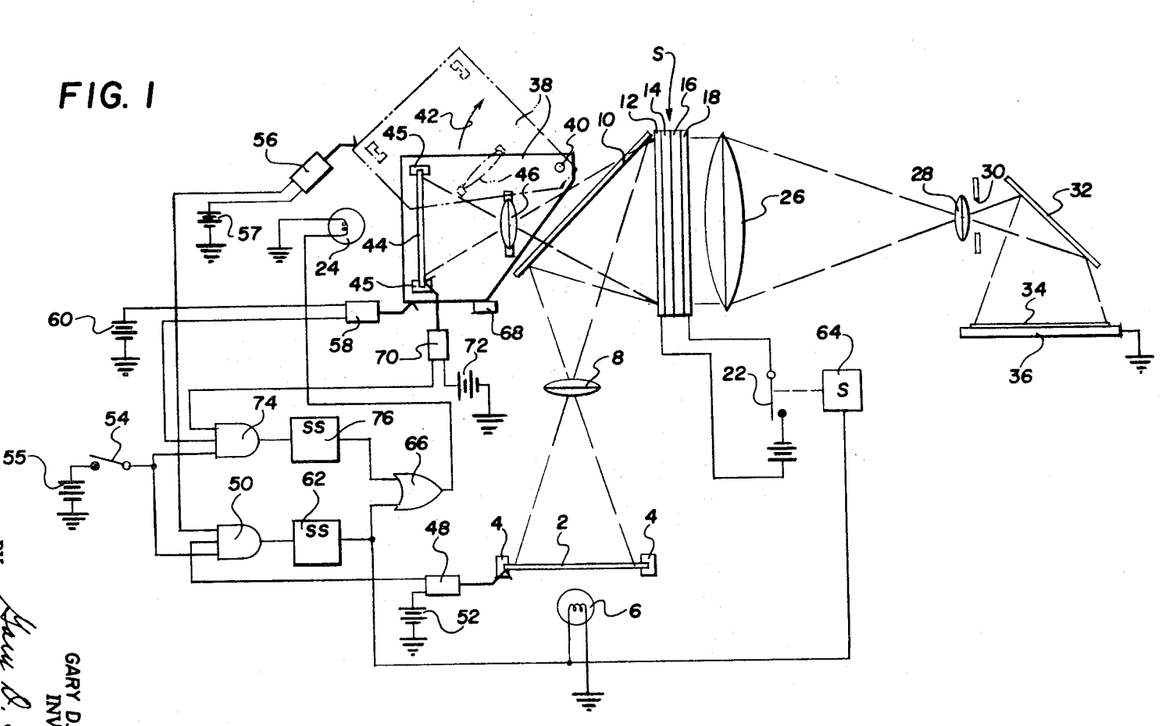
FIG. 1 is a diagrammatic view of one embodiment of the invention wherein a single light source is used to project a temporary image or an image of a positive original.

In accordance with this invention, in the embodiment of FIG. 1, a negative original 2 may be supported by a pair of spaced supports 4 in a projection plane so that the image thereon is projected by the first radiation means, such as ultraviolet lamp 6, through a lens system 8 onto dichroic mirror 10, which transmits white light but reflects ultraviolet light. Thus, mirror 10 reflects the image onto a photoconductive-liquid crystal sandwich structure S which includes in order: a first transparent electrode 12, a photoconductive layer 14 which is sensitive to ultraviolet light, a liquid crystal layer 16 and a second transparent electrode 18. A d.c. potential source 20 is provided which can be applied across the electrodes, as by switch 22 to create a field therebetween. In this way, a reverse temporary image can be created of original 2 on the liquid crystal layer 16, as will be more fully explained below. The temporary image is then projected by a light source of another wave length, such as a white light source 24, through field lens 26 and objective lens 28 and through an aperture 30 onto plane mirror 32 where it is reflected onto a photosensitive surface 34, such as a uniformly charged photoconductive layer supported on a conductive support 36. When lamp 24 is used to project a temporary image, positive image support 38 is pivoted about pivot pin 40 in the direction of arrow 42 so as not to interrupt radiation from lamp 24.

A suitable photoconductive material for photoconductive layer 14 is poly-N-vinylcarbozole or triphenylamine dispersed in a polystyrene vehicle. The liquid crystal layer 16 may be a nematic mesophase. One suitable nematic material comprises 80 mol percent of Butyl p-(p-ethoxyphenoxycarbonyl)-phenyl carbonate and 20 mol percent of p-[N-(p-methoxybenzylidene)amino] phenyl acetate. This material is a mesophase between 42°C and 52°C. Another suitable material is made up one-third by weight of each of P-[(p-methoxybenzylidene)amino] phenyl acetate; p-(p-methoxybenzylidene) amino butyrate; and p-(p-butoxybenzylidene) amino acetate which is a mesophase between 25°C and 55°C. Still another suitable nematic material is N-(p-methoxybenzylidene)-p-butylaniline which is a mesophase between 17°C and 44°C. Other suitable materials are listed on pp. 11–13 of *Molecular Structure and the Properties of Liquid Crystals* by G. W. Grey (1962).

A suitable thickness for the liquid crystal layer is 12 microns and is 10 microns for the photoconductive layer. The two layers conveniently are separated by a layer of cellulose nitrate of 1 micron or less in thickness which layer is to inhibit adverse chemical reactions between the liquid crystal material and the photoconductive material. In each embodiment a potential of 250 to 400 volts across the electrodes is satisfactory.

When a positive original, such as original 44 is mounted in supports 45 to be projected, ultraviolet lamp 6 is turned off and lamp 24 is used to project an image of positive original 44 along a projection path through lens 46, mounted on support 38, through dichroic mirror 10 and photoconductive-liquid crystal sandwich S onto photoconductive surface 34 to form a latent electrostatic image thereon. It will be understood that the images can be projected onto any photosensitive material but that the invention has particular application for projection onto a charged photoconductive surface since in each case a positive electrostatic latent image is formed which can be toned by direct development methods to form a positive toner image.

From the circuit logic shown in FIG. 1, it will be understood that if a negative original 2 is to be projected and is in the position shown, switch 48 will be closed to provide a signal to one input of AND gate 50, which switch is connected to a potential source 52. A second signal to AND gate 50 when print button 54 is closed is provided from potential source 55. A third and final input to AND gate 50 is provided when positive original support 38 is swung in the direction of arrow 42 to the dotted line position so that switch 56 is closed to supply a signal from potential source 57. When these positions are met AND gate 50 is enabled providing a signal to single shot 62 which in turn provides a signal of predetermined duration to ultraviolet lamp 6 to enable it and to solenoid 64 to close switch 22 thereby applying potential 20 across transparent electrodes 12 and 18 to provide an electric field therebetween. If required, means, not shown, can be provided to vary the exposure time for originals of varying density. At the same time, the signal from single shot 62 is provided to OR gate 66 which in turn provides a signal to white light lamp 24. Thus, the image on negative original is projected onto photoconductive layer 14 which acts as though it is more conductive in those areas which are exposed to light thereby increasing the electric field across corresponding portions of liquid crystal layer 16 to form a temporary positive image in the liquid crystal which is projected by means of white light 24 onto generally uniformly charged photosensitive surface 34 to form a positive electrostatic image which may be utilized in any well known manner. Upon termination of the signal from single shot 62 lamp 6 and lamp 24 will be turned off and solenoid 64 de-energized to return switch 22 to the position shown.

When positive original 44 is to be projected, support 38 must be positioned as shown in solid lines in FIG. 1 against stop 68 with the positive original in position to close switch 70 which is connected to potential source 72 to provide a signal to one input of AND gate 74. A second signal is provided to another input of AND gate 74 from switch 58 which is closed by engagement with support 38 and a third signal and final signal is provided to a third input to AND gate 74 when print button 54 is closed whereupon AND gate 74 is enabled to provide a signal to single shot 76. Single shot 76 provides an output signal of predetermined length to OR gate 66 which is enabled to energize lamp 24 and project the image of positive original 44 through dichroic mirror 10, photoconductive-liquid crystal sandwich S, and field lens 26 onto charged photoconductive surface 34 to form a positive electrostatic latent image thereon which may be utilized in a conventional manner. During the projection of an image from positive original 44, ultraviolet lamp 6 is not energized and no potential is applied across the photoconductive-liquid crystal sandwich S so that the liquid crystal layer remains in its quiescent or transparent state and therefore permits the image of positive image 44 to be projected therethrough.

It is readily apparent that a positive electrostatic latent image can be formed on photoconductive surface 34 from either a negative original or a positive original so that reverse development techniques need not be employed for the development of the electrostatic latent image. Thus, uniform quality of prints from both negative originals and positive originals can more nearly be maintained.

Figure 2:
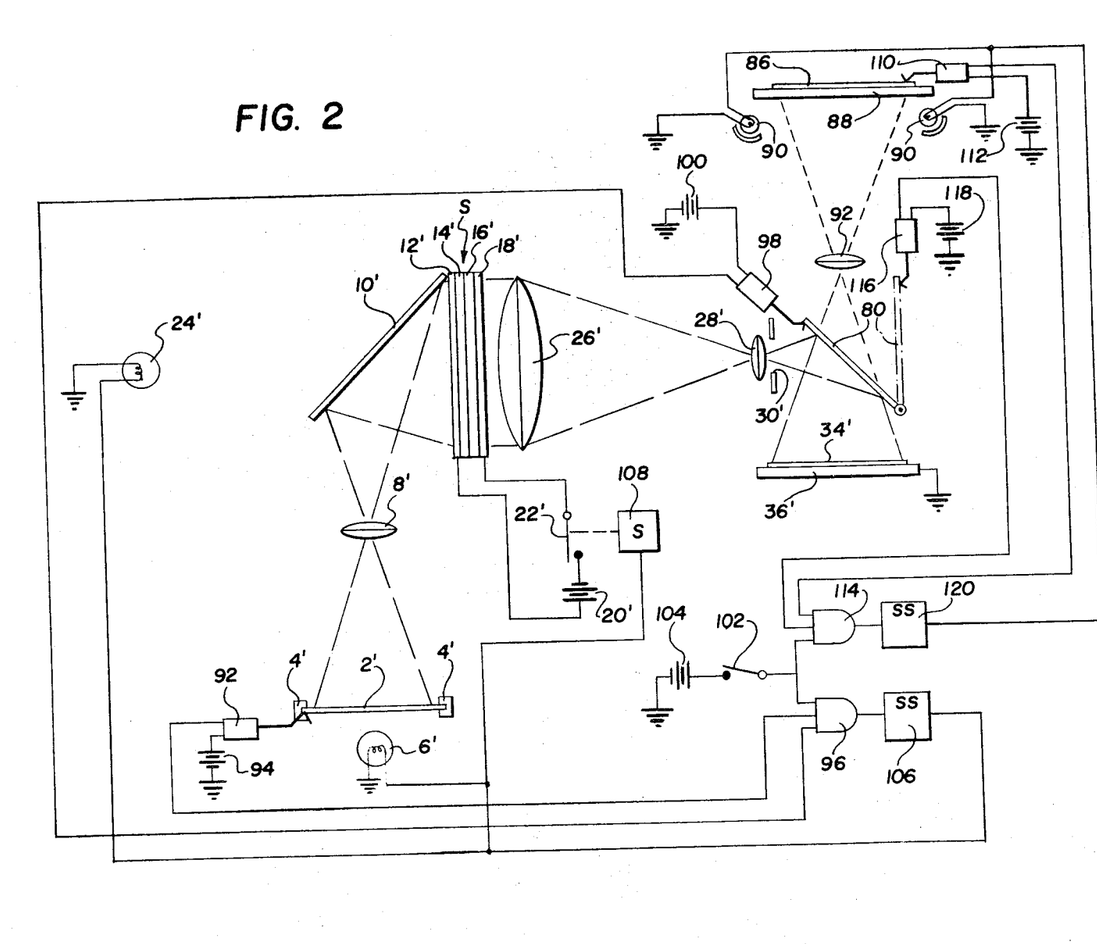
FIG. 2 is a diagrammatic view of an alternative embodiment of the invention wherein separate light sources are used to form a temporary image and to project an image of a positive original.

An alternative embodiment is shown in FIG. 2 wherein a negative original 2' is positioned by supports 4' so that an image thereof may be projected by ultraviolet lamp 6' through a lens system 8' onto a dichroic mirror 10', which reflects ultraviolet light but transmits white light. Thus, the negative image is projected onto photoconductive-liquid crystal sandwich S' which includes, in order, a transparent electrode 12', a photoconductive layer 14', a liquid crystal layer 16', and a second transparent electrode 18. Conveniently, potential source 20' may be applied across the electrodes by means of switch 22' to create an electrical field thereacross so that when the image of negative original 2' is projected onto photoconductive surface 14', the surface will act as if it is more conductive in the exposed areas to increase the field across liquid crystal layer 16' thereby forming a positive image therein which may be projected by means of white light 24' through field lens 26', objective lens 28' and aperture 30' to a pivotal plane mirror 80 onto a photosensitive surface, such as a charged photoconductor 34' supported on a conductive base 36'. Thus, the image of a negative original can be formed into a positive temporary image on the photoconductive-liquid crystal sandwich structure and this positive image can be projected onto a charged photoconductive surface 34' to form a positve electrostatic latent image which can be developed by conventional techniques.

In this embodiment, if a copy is to be made of a positive original, the original 86 is supported, as by a transparent base 88 for illumination, as by white light sources 90, so that the positive image thereof is projected through lens system 92 onto charged photoconductive surface 34' when plane mirror 80 is pivoted to the dotted line position.

Circuit logic which can be used for controlling this apparatus is illustrated. When a negative original is positioned, as shown in FIG. 2, switch 93 which is connected to potential source 94 will be closed providing a signal to one input of AND gate 96. A second signal to a second input of AND gate 96 will be provided by switch 98 from potential source 100 which switch 98 is engaged by pivotal plane mirror 80 in the solid line position. A third and final input signal to AND gate 96 is provided when print button 102, which is connected to potential source 104, is closed. Whe these conditions are met, AND gate 96 is enabled to provide a signal to single shot 106 which in turn provides a signal of a predetermined time duration which energizes ultraviolet light 6' to project the image of the negative original onto photoconductive-liquid crystal sandwich S' and at the same time energizes solenoid 108 to close switch 22' to create a field between electrodes 12' and 18'. This same signal from single shot 106 also energizes lamp 24' so that the temporary image thus formed on the photoconductive-liquid crystal sandwich will be projected so as to be reflected by plane mirror 80 onto charged photoconductive surface 34' to form a positive electrostatic latent image.

When an image of positive original 86 is to be projected, switch 110, connected to potential source 112, is closed to provide an input signal to AND gate 114. A second input to AND gate 114 is provided when mirror 80 is in the dotted line position to close switch 116, connected to potential source 118. The third and final input to AND gate 114 is provided when the operator closes print button 102 thereby enabling AND gate 114 to provide a signal to single shot 120 which in turn provides a signal of a predetermined time duration to energize lamps 90 thereby projecting an image of original 86 onto charged photoconductive surface 34' to provide a positive electrostatic latent image which may be developed or otherwise used in a conventional manner. Of course, means not shows, may be provided in each instance to vary the exposure time in accordance with the density and contrast of the original.

If desired, a liquid crystal material having a memory, such as a mixture of nematic and cholesteric mesophases, can be used in the embodiments of FIGS. 1 and 2, in which case, both light sources may provide radiation of the same wavelength. An image of the original is projected, by one light source, onto the sandwich structure while a potential is applied across the electrodes to form a temporary image. After the potential is removed, the temporary image is projected by the other light source onto the photosensitive material.

A suitable liquid crystal material is a mixture of a nematic mesophase, such as N-[p-Methoxybenzylidene]-p-Butylaniline and a cholesteric mesophase of cholesteryl oleyl carbonate, wherein the mixture is 10 parts by weight of nematic mesophase to one part cholesteric mesophase. The photoconductive material can be 4, 4'-diethylamino-2, 2'-dimethyltriphenol methane and a polycarbonate resin together with a pyrylium dye prepared as in Example I of British Patent 1,153,506 issued Sept. 29, 1969.

Figure 3:
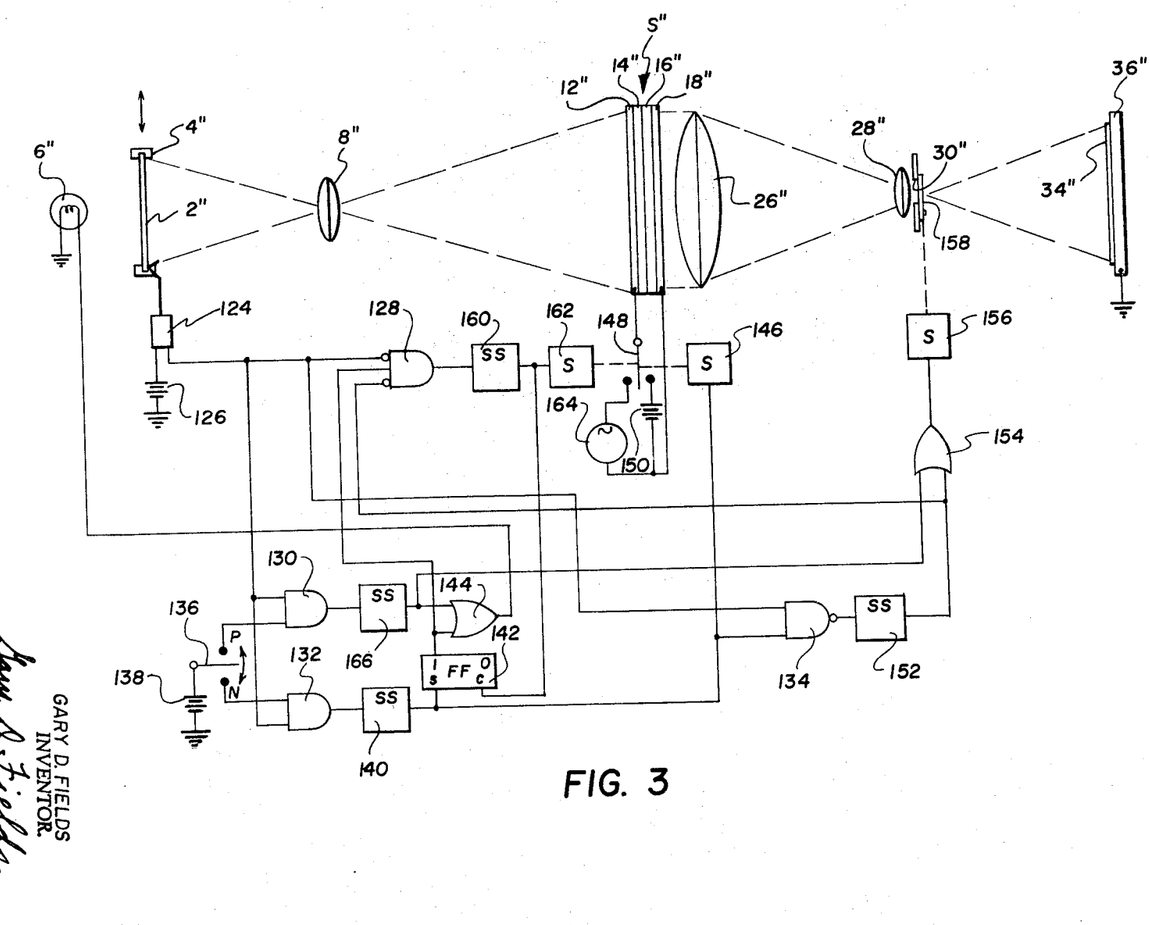
FIG. 3 is a diagrammatic view of a further alternative embodiment having a single light source.

A low cost exposure station is illustrated in FIG. 3 for use with a memory type liquid crystal which requires only one exposure lamp. In this embodiment, a negative original 2'', is positioned, as by suport 4'' so that an image thereof may be projected by lamp 6'' along an optical path through objective lens 8'' onto sandwich structure S'' which includes in order: a first transparent electrode 12'', a photoconductive layer 14'', a liquid crystal layer 16'' and a second transparent electrode 18''. A reverse or positive temporary image is formed in the liquid crystal layer, after which the original is removed from the optical path and the temporary image is projected by lamp 6'' through field lens 26'' and objective lens 28'' at aperture 30'' onto a photosensitive surface, such as charged photoconductive surface 34'' on a conductive backing 36'', to form a positive electrostatic latent image. A positive original can also be positioned by support 4'' to be projected through sandwich structure S'' which is maintained in a transparent condition so that the image of the original is projected therethrough the sandwich structure and directly onto photoconductive surface 34'' to form a positive electrostatic latent image.

When negative original 2'' is positioned, as shown, by the operator switch 124 which is connected to a power source 126 will be closed to provide a signal to one input of each of AND gates 128, 130 and 132 and to NAND gate 134. The operator then closes switch 136 against terminal N so that a signal is provided from power source 138 to the second and final input of AND gate 132. This causes AND gate 132 to be enabled and provide a signal to single shot 140 which in turn sets flip-flop 142 so that it provides a signal from its "one" terminal to a second input of AND gate 128 and to input of OR gate 144 which is enabled to energize lamp 6''. At the same time the signal from single shot 140, energizes solenoid 146 to close switch 148 to connect d.c. potential source 150 across electrodes 12'' and 18''. The signal from single shot 140 is also provided to the second and final input of NAND gate 134. Thus, photoconductive layer 14'' is exposed to an image of negative original 2'' to form a temporary reverse image on liquid crystal layer 16'' while potential 150 is applied across the electrodes. Upon termination of the signal from single shot 140, switch 148 returns to its normally open position shown in FIG. 3 and the positive temporary image on liquid crystal layer 16'' will be stored thereon. The operator then removes original 2'' from the optical path so that light 6'' projects the positive temporary image onto charged photoconductive surface 34''. Upon removal of the original, switch 124 is opened enabling NAND gate 134, which in turn enables single shot 152 to enable OR gate 154 and solenoid 156 to open shutter 158 for a predetermined exposure time thereby forming a positive electrostatic latent image on photoconductive surface 34''. The output of single shot 152 is also connected to AND gate 128 which is enabled when this signal is terminated, upon completion of the exposure, to enable single shot 160 and energize solenoid 162. This positions switch 148 to apply a.c. potential source 164 across electrodes 12'' and 18'' to erase the temporary image on liquid crystal layer 16''. Upon termination of the signal from single shot 160, switch 148 returns to its intermediate open position, as shown. The signal from single shot 160 also clears flip-flop 142 so that the circuit is in proper state for exposing a subsequent charged photoconductive surface to another original.

When a positive original is positioned in the optical path in the position previously occupied by negative original 2'', the operator closes swwtch 136 against the terminal P so that an input signal is provided from potential source 138 to one input of AND gate 130 whose second and final input is provided from potential source 126 by closed switch 124. This enables AND gate 130 which then enables single shot 166 to provide a signal to OR gate 144 to illuminate lamp 6'' and also provides a signal to OR gate 154 to energize solenoid 156 to open shutter 158. Since switch 148 remains in its intermediate position so that no potential is applied across electrodes 12'' and 18'', no image is formed on liquid crystal layer 16'' and photoconductive-liquid crystal sandwich S'' remain transparent and transmits the image from the positive original to charged photoconductive surface 34'' to form a positive electrostatic latent image.

If desired, lamp 6'' can be replaced with two separate light sources of different intensities or means (not shown) can be provided to adjust the intensity of lamp 6''.

From the foregoing, the advantages of this invention are readily apparent. An exposure station has been provided wherein a positive electrostatic image can be formed from either a positive or negative original thereby eliminating the necessity of developing one of the images by reverse development techniques. In the embodiment of FIG. 1, a temporary image is formed on a photoconductive-liquid crystal sandwich by projecting an image of a negative original by ultraviolet light and then projecting, by means of white light, the temporary image thus formed in the liquid crystal layer onto a charged photoconductive surface to form a positive electrostatic latent image. A positive original is projected by means of the same white light source which projects the image through the photoconductive liquid crystal sandwich, when the sandwich is in the quiescent or transparent state, onto the charged photoconductive surface to once again form a positive electrostatic latent image.

In the embodiment of FIG. 2 a negative original image is projected as in FIG. 1 to form a temporary positive image in the liquid crystal layer which in turn is projected by a white light onto a charged photoconductive surface to form a positive electrostatic latent image. A positive original is projected through a lens system directly onto a charged photoconductive surface, without passing through the photoconductive-liquid crystal sandwich to form a positive electrostatic latent image.

In the embodiment of FIG. 3, a single mount is required for both a negative and a positive original and a single light source can be used, if desired, to form the temporary image and to expose a photosensitive surface to the temporary image.

It will be understood that different circuitry could be used than that disclosed and that in the various embodiments and the photoconductive layer of the liquid crystal sandwich structures could be sensitive to a different range of the electromagnetic spectrum and that another different portion of the electromagnetic spectrum could be used to project a temporary image rather than the visible or white light range described so long as the photosensitive surface upon which a latent image is to be made is sensitive to the particular portion of the electromagnetic spectrum which is used to project the image onto the charged photoconductive surface.

Standard logic symbols have been used herein as disclosed in *American Standard Graphic Symbols For Logic* Diagrams (ASA Y32.14–1962), published by the American Institute of Electrical Engineers.

The invention has been described in detail with reference to preferred embodiments thereof, but it will be understood that variations and modifications can be effected within the spirit and scope of the invention.

I claim:

1. Apparatus for forming a latent image on a photosensitive surface from either a first original or a second original, which is the reverse of the first original, wherein the latent image of the first original is reversed and the latent image of the second original is the same as the second original, said paparatus comprising:
    means for supporting the photosensitive surface for exposure;
    means for forming a temporary image which is the reverse of the first original image in response to exposure to a radiation pattern corresponding to the first original image;
    means for supporting the first and second originals;
    means for exposing said temporary image forming means to a radiation pattern corresponding to the first original to form said reverse temporary image;
    means for projecting radiation through said reverse temporary image to expose the photosensitive surface to form a latent image thereon which is the reverse of the first original;
    means for exposing the photosensitive surface to an image of the second original to form a latent image which is the same as the second original; and
    means for selectively forming a latent image from either the first original or the second original.

2. An apparatus, as claimed in claim 1, wherein said temporary image forming means includes:
    a liquid crystal layer in which said temporary image is formed;
    means for applying an electric field across said liquid crystal layer; and
    means for varying said electric field across said liquid crystal layer in response to exposure of said temporary image forming means to said radiation pattern to form said reverse temporary image in said liquid crystal layer.

3. An apparatus, as claimed in claim 2, wherein said means to vary the electric field includes:
    a photoconductive layer adjacent said liquid crystal layer;
    wherein said means for forming a radiation pattern corresponding to an image of the first original includes:
    a first source of radiation; and wherein said means for forming said temporary image includes:
    a second source of radiation.

4. An apparatus for forming a latent image on a photosensitive surface from either a first original or a second original, which is the reverse of the first original, wherein the latent image of the first original is reversed and the latent image of the second original is the same as the second original, said apparatus comprising:
    means for supporting the photosensitive surface for exposure:
    a layered sandwich structure which includes in order:
    a first transparent electrode;
    a photoconductive layer;
    a liquid crystal layer; and
    a second transparent electrode;
    means for applying a potential between said electrodes;
    means for supporting the first original;
    means for exposing said photoconductive layer to an image of the first original when said potential is applied across said electrodes to increase the electric field across portions of said liquid crystal layer corresponding to exposed portions of said photoconductive layer to form a reverse temporary image in said liquid crystal layer;
    means for projecting radiation through said layered sandwich structure to expose the photoconductive surface to said reverse temporary image to form a latent image on the photosensitive surface which is the reverse of said first original;
    means for supporting the second original;
    means for exposing the photosensitive surface to an image of the second original to form a corresponding latent image on the photosensitive surface; and
    means for selectively forming a latent image from either the first original or the second original.

5. An exposure station for forming a positive electrostatic latent image on a charged photoconductive surface from either a positive original or a negative original, said exposure station comprising:
    means for supporting the charged photoconductive surface for exposure;
    a layered sandwich structure which includes in order:
    a first transparent electrode;
    a photoconductive layer;
    a liquid crystal layer; and
    a second transparent electrode;
    means for applying a potential between said electrodes;
    means for supporting the negative original;

first means for exposing the photoconductive layer to an image of the negative original when said potential is applied across said electrodes to increase the electric field across portions of said liquid crystal layer corresponding to exposed portions of said photoconductive layer to form a positive temporary image in said liquid crystal layer;

first image projecting means for projecting radiation along a projection path through said layered sandwich structure to expose the charged photoconductive surface to said positive temporary image to form a corresponding positive electrostatic latent image on the photoconductive surface;

means for supporting the positive original;

second image projecting means for projecting radiation along a path for exposing the charged photoconductive surface to the image of said positive original to form a corresponding positive electrostatic latent image on the photoconductive surface; and means for selectively enabling either said first image projecting means or said second image projecting means.

6. An exposure station, as claimed in claim 5, wherein said means for exposing the charged photoconductive surface to said positive original includes:
said first radiation projecting means; and
said positive original supporting means.

7. An exposure station as claimed in claim 6, wherin said means for exposing the charged photoconductive surface to said positive original further includes:
means mounting said positive original supporting means for movement from a first position along said projection path and between said radiation projecting means and said layered sandwich structure, for projecting the image of the positive original through said sandwich structure to expose the charged photoconductive surface to said positive original, and a second position spaced from said optical path wherein said radiation projecting means is usable to expose the charged photoconductive surface to said positive temporary image.

8. An exposure station, as claimed in claim 5, wherein said means for exposing the charged photoconductive surface to an image of the positive original includes:
second means for projecting radiation to form the corresponding positive electrostatic latent image on the charged photoconductive surface.

9. An exposure station, as claimed in claim 8, wherein said means for exposing the charged photoconductive surface to an image of a positive original further includes:
a plane mirror pivotal from a first position for reflecting a radiation pattern from one of said temporary image and the positive original onto said charged photoconductive surface to a second position wherein a radiation pattern from the other of said temporary image and the positive original is projectable directly onto said charged photoconductive surface without being reflected from said mirror.

10. An exposure station for forming a positive electrostatic latent image on a charged photoconductive surface from either a positive original or a negative original, said exposure station comprising:
means for supporting the charged photoconductive surface for exposure;
a layered sandwich structure which includes in order:
 a first transparent electrode;
 a photoconductive layer which is responsive only to the ultraviolet portion of the electromagnetic spectrum;
 a liquid crystal layer; and
 a second transparent electrode;
means for applying a potential between said electrodes;
means for supporting the negative original;
a source of ultraviolet light for projecting an image of the negative original along an optical path onto said photoconductive layer when said potential is applied across said electrodes to render exposed areas of said photoconductive layer more conductive than unexposed areas thereof to form a positive temporary image on said liquid crystal layer;
a dichroic mirror for reflecting ultraviolet light and transmitting white light positioned along said optical path to reflect said negative image projected by said ultraviolet light onto said photoconductive layer;
a source of white light positioned to be projected along a projection path through said dichroic mirror and said sandwich structure to expose said charged photoconductive surface to said temporary image to form a corresponding positive electrostatic latent image on said photoconductive surface; and
means for supporting the positive original movable from a first position along said projection path and between said white light source and said dichroic mirror, for projecting an image of the positive original through said dichroic mirror and said sandwich structure to expose said charged photoconductive surface to an image of the positive original to form a corresponding positive electrostatic latent image on said photoconductive surface, to a second position spaced from said projection path for projecting said temporary image.

11. An exposure station, as claimed in claim 10, wherein said movable supporting means includes:
lens means for projecting an image of the positive original.

12. An exposure station, as claimed in claim 10, further including:
means for enabling said ultraviolet light source and said white light source and for applying said potential across said electrodes when a negative original is supported by said negative original supporting means and said positive original supporting means is in said second position and for enabling said white light source and disabling said ultraviolet light source and said potential applying means when said means for supporting said positive original is in said first position and a positive original is supported thereby.

13. An exposure station for forming a positive electrostatic latent image on a charged photoconductive surface from either a positive original or a negative original, said exposure station comprising:
means for supporting the charged photoconductive surface for exposure;
a layered sandwich structure which includes in order:
 a first transparent electrode;

a photoconductive layer which is responsive only to the ultraviolet portion of the electromagnetic spectrum;

a liquid crystal layer; and a second transparent electrode;

means for applying a potential between said electrodes;

means for supporting a negative original;

a source of ultraviolet light for projecting an image of the negative original onto said photoconductive layer when said potenital is applied across said electrodes to render exposed areas of said photoconductive layer more conductive than unexposed areas thereof to form a positive temporary image on said liquid crystal layer;

a first source of white light for projecting said temporary image along an optical path to expose the charged photoconductive surface to said temporary image to form a corresponding positive electrostatic latent image on the photoconductive surface;

a plane mirror movable from a first position along said optical path, for reflecting said positive temporary image projected by said first white light source onto the charged photoconductive surface, to a second position spaced from said optical path;

means for supporting the positive original; and a second source of white light for projecting an image of the positive original onto the charged photoconductive surface when said plane mirror is in said second position.

14. An exposure station, as claimed in claim 13, further including:

means for enabling said ultraviolet light source and said first white light source and for applying said potential across said electrodes and for disabling said second white light source when a negative original is supported by said negative original supporting means and said plane mirror is in said first position and for enabling said second white light source and for disabling said first white light source when a positive original is supported by said positive original supporting means and said plane mirror is in siad second position.

15. Apparatus for forming a latent image on a photosensitive surface from either a first original or a second original, which is the reverse of the first original, wherein the latent image of the first original is reversed and the latent image of the second original is the same as the second original, said apparatus comprising:

means for supporting the photosensitive surface for exposure;

a layered sandwich structure which includes in order:
a first transparent electrode;
a photoconductive layer;
a liquid crystal layer of the type having the capacity to store an image at least temporarily; and
a second transparent electrode;

means for applying a first potential between said electrodes during formation of a temporary image in said liquid crystal layer;

means for applying a second potential between said electrodes to erase said temporary image;

means for supporting either said first original or said second original;

means for projecting illumination;

first control means to sequentially: enable said first potential applying means and said illumination means when the first original is in said supporting means to expose said photoconductive layer to a pattern of radiation corresponding to said first original to form said reverse temporary image in said liquid crystal layer; disables said first potential applying means when the first original is removed from said supporting means and expose said photosensitive surface to said reverse temporary image for a predetermined time to form a latent image corresponding to said reverse temporary image; and enable said second potential applying means to erase said reverse temporary image after exposure of said photosensitive surface to said temporary image;

second control means to enable said illumination means when the second original is in said supporting means to expose the photosensitive surface to a radiation pattern corresponding to said second original to form a latent image corresponding to said second original; and means for selectively enabling either said first control means or said second control means.

16. An exposure station for forming a positive electrostatic latent image on a charged photoconductive surface from either a positive original or a negative original, said exposure station comprising:

means for supporting the charged photoconductive surface for exposure;

a layered sandwich structure which includes in order:
a first transparent electrode;
a photoconductive layer;
a liquid crystal layer of the type having the capacity to store an image at least temporarily; and
a second transparent electrode;

means for applying a first potential between said electrodes during formation of a temporary image in said liquid crystal layer;

means for applying a second potential between said electrodes to erase said temporary image;

means for supporting either said first original or said second original;

means for projecting illumination;

first control means to sequentially: enable said first potential applying means and said illumination means when said negative original is in said supporting means to expose said photoconductive layer to an image of said negative original projected along an optical path to form said positive temporary image in said liquid crystal layer; disable said first potential applying means when the negative original is removed from said supporting means and project said positive temporary image into said charged photoconductive surface for a predetermined time to form a positive electrostatic latent image; and enable said second potential applying means to erase said positive temporary image after exposure of said photoconductive surface to said temporary image;

second control means to enable said illumination means when the positive original is in said supporting means to expose the charged photoconductive surface for a predetermined period of time to an image of said positive original projected along said optical path and through said layered sandwich structure by said illumination means and to form a positive electrostatic latent image on said photoconductive surface; and means for selectively enabling either said first control means or said second control means.

17. Apparatus, as claimed in claim 16, wherein said liquid crystal layer comprises:

a mixture of nematic and cholesteric liquid crystal materials.

* * * * *